(12) United States Patent
Bian et al.

(10) Patent No.: US 10,535,376 B1
(45) Date of Patent: Jan. 14, 2020

(54) HARD DISK ASSEMBLY DEVICE

(71) Applicants: Maintek Computer (Suzhou) Co., Ltd., JiangSu (CN); PEGATRON CORPORATION, Taipei (TW)

(72) Inventors: Hui Bian, JiangSu (CN); Yan-Bo An, JiangSu (CN); Jing-Bo Wang, JiangSu (CN); Chia-Cheng Tang, JiangSu (CN); Xue-Bing Cheng, JiangSu (CN)

(73) Assignees: Maintek Computer (Suzhou) Co., Ltd., Jiangsu (CN); Pegatron Corporation, Taipei (TW)

( * ) Notice: Subject to any disclaimer, the term of this patent is extended or adjusted under 35 U.S.C. 154(b) by 0 days.

(21) Appl. No.: 16/418,732

(22) Filed: May 21, 2019

(30) Foreign Application Priority Data

Jul. 6, 2018 (CN) .......................... 2018 1 0737838

(51) Int. Cl.
*G06F 1/16* (2006.01)
*G11B 33/02* (2006.01)
*G06F 1/18* (2006.01)

(52) U.S. Cl.
CPC ............ *G11B 33/022* (2013.01); *G06F 1/187* (2013.01)

(58) Field of Classification Search
CPC ........................................................ G06F 1/187
USPC .......................... 361/679.33, 679.36, 679.37
See application file for complete search history.

(56) References Cited

U.S. PATENT DOCUMENTS

| | | | | |
|---|---|---|---|---|
| 7,375,959 | B2* | 5/2008 | Chang ..................... | G06F 1/184 312/223.2 |
| 8,411,432 | B1* | 4/2013 | Zimlin .................. | G06F 1/1616 361/679.34 |
| 8,817,460 | B2* | 8/2014 | Yu ........................... | G06F 1/187 312/223.1 |
| 2008/0089021 | A1* | 4/2008 | Deng ...................... | G06F 1/187 361/679.39 |
| 2008/0298005 | A1* | 12/2008 | Deng ...................... | G06F 1/187 361/825 |
| 2011/0019357 | A1* | 1/2011 | Lin ......................... | F16C 29/02 361/679.39 |
| 2013/0127310 | A1* | 5/2013 | Yu ........................... | G06F 1/187 312/223.2 |
| 2015/0077921 | A1* | 3/2015 | Tsai ..................... | G11B 33/124 361/679.33 |

FOREIGN PATENT DOCUMENTS

CN        204515638        7/2015

* cited by examiner

*Primary Examiner* — Anthony Q Edwards
(74) *Attorney, Agent, or Firm* — J.C. Patents

(57) ABSTRACT

The present disclosure provides a hard disk assembly device for assembling a hard disk into a case. Two opposite sides of the hard disk respectively have at least one first positioning portion and at least one second positioning portion. The hard disk assembly device includes a flexible fixing frame and a fixing bracket. One side of the flexible fixing frame includes at least one third positioning portion and at least one first guiding portion, and the other side of the flexible fixing frame includes at least one fourth positioning portion, a draw tape, and two fastening portions. The two fastening portions are respectively correspondingly connected with two ends of the draw tape. The hard disk is fixed in the flexible fixing frame. The flexible fixing frame is fixed to the fixing bracket.

20 Claims, 10 Drawing Sheets

HARD DISK ASSEMBLY DEVICE

CROSS-REFERENCE TO RELATED APPLICATION

This application claims the priority benefit of China application serial no. 201810737838.7, filed on Jul. 6, 2018. The entirety of the above-mentioned patent application is hereby incorporated by reference herein and made a part of this specification.

BACKGROUND

Technical Field

The present disclosure relates to a hard disk assembly device and, more particularly, to a hard disk assembly device for assembling a hard disk into a case.

Related Art

Because of the large internal heat dissipation space of desktop computers, electronic elements that emit high heat but are highly efficient can be used. Compared with portable electronic devices, desktop computers have the advantages of high operating efficiency, large-capacity storage space, and large-capacity memory, and therefore desktop computers are very popular either in leisure use or commercial use. To assemble the hard disk into the case of a traditional desktop computer, screws are mainly used to fix the hard disk to the case. However, the fixing manner of using the screws to fix the hard disk to the case is complicated in the assembly process of the production line, causing a long assembly time. In the later repair or replacement of the hard disk, a separate screwdriver is required as a removal tool, and therefore the operation steps of repair or replacement are cumbersome, which not only is inconvenient but also takes a lot of time.

SUMMARY

The present disclosure is directed to a hard disk assembly device that improves the assembly, repair, and replacement convenience of a hard disk.

According to the present disclosure, the hard disk assembly device is used for assembling the hard disk into the case. Two opposite sides of the hard disk respectively have at least one first positioning portion and at least one second positioning portion. The hard disk assembly device includes a flexible fixing frame and a fixing bracket. One side of the flexible fixing frame includes at least one third positioning portion and at least one first guiding portion, and the other side of the flexible fixing frame includes at least one fourth positioning portion, a draw tape, and two fastening portions. The two fastening portions are respectively correspondingly connected with the two ends of the draw tape. When the hard disk is assembled to the flexible fixing frame, the at least one third positioning portion is engaged with the at least one first positioning portion, and the at least one fourth positioning portion is engaged with the at least one second positioning portion to allow the hard disk to be fixed in the flexible fixing frame. The fixing bracket is capable of being fixed in the case. The bottom side of the fixing bracket has at least one second guiding portion, and two sides of the fixing bracket respectively have a limiting portion. When the flexible fixing frame is assembled to the fixing bracket, the at least one first guiding portion is engaged with the at least one second guiding portion, and the two fastening portions are respectively correspondingly engaged with the two limiting portions to allow the flexible fixing frame to be fixed to the fixing bracket.

In the hard disk assembly device according to the embodiments of the present disclosure, the flexible fixing frame may be a plastic material, and the flexible fixing frame may be capable of generating elastic deformation.

In the hard disk assembly device according to the embodiments of the present disclosure, the fixing bracket may be a metal material.

In the hard disk assembly device according to the embodiments of the present disclosure, the at least one first positioning portion and the at least one second positioning portion may be hole-like structures. The at least one third positioning portion and the at least one fourth positioning portion may be columnar structures corresponding to the at least one first positioning portion and the at least one second positioning portion, and the at least one third positioning portion and the at least one fourth positioning portion may be respectively correspondingly engaged with the at least one first positioning portion and the at least one second positioning portion to limit the relative position between the hard disk and the flexible fixing frame.

In the hard disk assembly device according to the embodiments of the present disclosure, the at least one first guiding portion may be a columnar structure, and the at least one second guiding portion may be a hole-like structure corresponding to the at least one first guiding portion. The at least one first guiding portion may be engaged with the at least one second guiding portion to limit the relative position between the flexible fixing frame and the fixing bracket.

In the hard disk assembly device according to the embodiments of the present disclosure, the two fastening portions may be hook-like structures, and the two limiting portions may be hole-like structures corresponding to the two fastening portions. The two fastening portions may be engaged with the two limiting portions to limit the relative position between the flexible fixing frame and the fixing bracket.

In the hard disk assembly device according to the embodiments of the present disclosure, the flexible fixing frame may include a frame body. The at least one third positioning portion may be coupled to the frame body. The at least one first guiding portion and the at least one fourth positioning portion may be respectively connected with the frame body. The two ends of the draw tape may be respectively connected with the frame body, and the frame body may be configured to accommodate the hard disk. The at least one third positioning portion may be located between the at least one first guiding portion and the at least one fourth positioning portion, and the at least one fourth positioning portion may be located between the at least one third positioning portion and the draw tape.

In the hard disk assembly device according to the embodiments of the present disclosure, the frame body, the at least one first guiding portion, the at least one fourth positioning portion, the draw tape, and the two fastening portions may be integrally formed.

In the hard disk assembly device according to the embodiments of the present disclosure, the frame body may include a bottom frame, a first side wall, and a second side wall. The first side wall may be connected with one side of the bottom frame. The at least one third positioning portion may be coupled to the first side wall, and the at least one first guiding portion may be connected with the first side wall. The second side wall may be connected with the other side of the bottom frame. The at least one fourth positioning portion, the draw tape, and the two fastening portions may be connected with the second side wall.

In the hard disk assembly device according to the embodiments of the present disclosure, the flexible fixing frame may further include a first gap and a second gap. The first gap may be located between the first side wall and the second side wall and may be located on one side of the bottom frame, and the second gap may be located between the first side wall and the second side wall and may be located on the other side of the bottom frame. The first gap and the second gap may be configured to make the second side wall easy to generate elastic deformation in a direction away from the first side wall.

In the hard disk assembly device according to the embodiments of the present disclosure, the bottom frame may include a first connecting portion, a second connecting portion, and a third connecting portion. The second connecting portion may be connected with the first connecting portion. The third connecting portion may be connected with the second connecting portion. The second connecting portion may be located between the first connecting portion and the third connecting portion. The first side wall may be connected with one end of the first connecting portion, the second connecting portion, and the third connecting portion, and the second side wall may be connected with the other end of the first connecting portion, the second connecting portion, and the third connecting portion.

In the hard disk assembly device according to the embodiments of the present disclosure, the bottom frame may further include a fourth connecting portion, a fifth connecting portion, a sixth connecting portion, and a seventh connecting portion. Two ends of the fourth connecting portion may be connected with one end of the first connecting portion and one end of the second connecting portion. Two ends of the fifth connecting portion may be connected with the other end of the first connecting portion and the other end of the second connecting portion. Two ends of the sixth connecting portion may be connected with one end of the second connecting portion and one end of the third connecting portion. The second connecting portion may be located between the fourth connecting portion and the sixth connecting portion. Two ends of the seventh connecting portion may be connected with the other end of the second connecting portion and the other end of the third connecting portion. The second connecting portion may be located between the fifth connecting portion and the seventh connecting portion. The first side wall may be connected with the fourth connecting portion and the sixth connecting portion, and the second side wall may be connected with the fifth connecting portion and the seventh connecting portion.

In the hard disk assembly device according to the embodiments of the present disclosure, the width of the first connecting portion may be greater than the width of the second connecting portion and the width of the third connecting portion so as to enhance the overall strength of the flexible fixing frame.

In the hard disk assembly device according to the embodiments of the present disclosure, the first connecting portion may have a recess, and the recess may be configured to make the second side wall easy to generate elastic deformation in a direction away from the first side wall.

In the hard disk assembly device according to the embodiments of the present disclosure, the bottom frame may have a first opening between the first connecting portion and the second connecting portion, and the bottom frame may have a second opening between the second connecting portion and the third connecting portion. The first opening and the second opening may be configured to make the second side wall easy to generate elastic deformation in a direction away from the first side wall.

In the hard disk assembly device according to the embodiments of the present disclosure, the flexible fixing frame may further include at least one positioning member. The frame body may have at least one first fastening hole and at least one second fastening hole communicating with the at least one first fastening hole. The at least one positioning member may include a body, a penetrating portion, and a buffer portion. The body may be configured to pass through the at least one first fastening hole. The penetrating portion may be connected with the body and configured to pass through one of the at least one first fastening hole and the at least one second fastening hole. When the penetrating portion moves into the second fastening hole, the positioning member may be fixed to the frame body. The buffer portion may be connected with the penetrating portion. The penetrating portion may be located between the body and the buffer portion. The at least one third positioning portion may be connected with the buffer portion. The buffer portion may be located between the penetrating portion and the at least one third positioning portion, and the buffer portion may be configured to abut against the hard disk to reduce the vibration transmitted into the hard disk by the case.

In the hard disk assembly device according to the embodiments of the present disclosure, the hole diameter of the at least one first fastening hole may be greater than the hole diameter of the at least one second fastening hole. The outer diameter of the body may be equal to the hole diameter of the at least one first fastening hole. The outer diameter of the penetrating portion may be equal to the hole diameter of the at least one second fastening hole. The outer diameter of the buffer portion may be greater than the hole diameter of the at least one first fastening hole and the hole diameter of the at least one second fastening hole.

In the hard disk assembly device according to the embodiments of the present disclosure, the draw tape may include a tape body, a pulling portion, and two pressing portions. Two ends of the tape body may be respectively connected with the frame body. The pulling portion may be connected with the tape body and configured to make the tape body generate elastic deformation in a direction away from the frame body. The two pressing portions may be connected with the tape body, and the pulling portion may be located between the two pressing portions. The two pressing portions may be configured to help the two fastening portions move into the two limiting portions.

In the hard disk assembly device according to the embodiments of the present disclosure, the draw tape may further include two reinforcing portions connected with the two ends of the tape body to increase the connection strength between the draw tape and the frame body.

In the hard disk assembly device according to the embodiments of the present disclosure, the flexible fixing frame may have a third gap located between the draw tape and the frame body, and the third gap may be configured to make the draw tape easy to generate elastic deformation in a direction away from the two limiting portions further to allow the two fastening portions to move out of the two limiting portions.

In summary, when a user needs to replace or repair the hard disk, he/she can directly remove the flexible fixing frame from the fixing bracket without using any tools via the quick disassembly design of the hard disk assembly device of the present disclosure, and he/she can further remove the hard disk from the flexible fixing frame. Accordingly, the disassembly of the hard disk is fast and convenient, thereby eliminating the use of the screws in the traditional assembly manner. Since any assembly, repair, and replacement of the hard disk does not require any disassembly and assembly tool, the convenience of assembly, repair, and replacement of the hard disk can also be enhanced.

DETAILED DESCRIPTION

Figure 1:
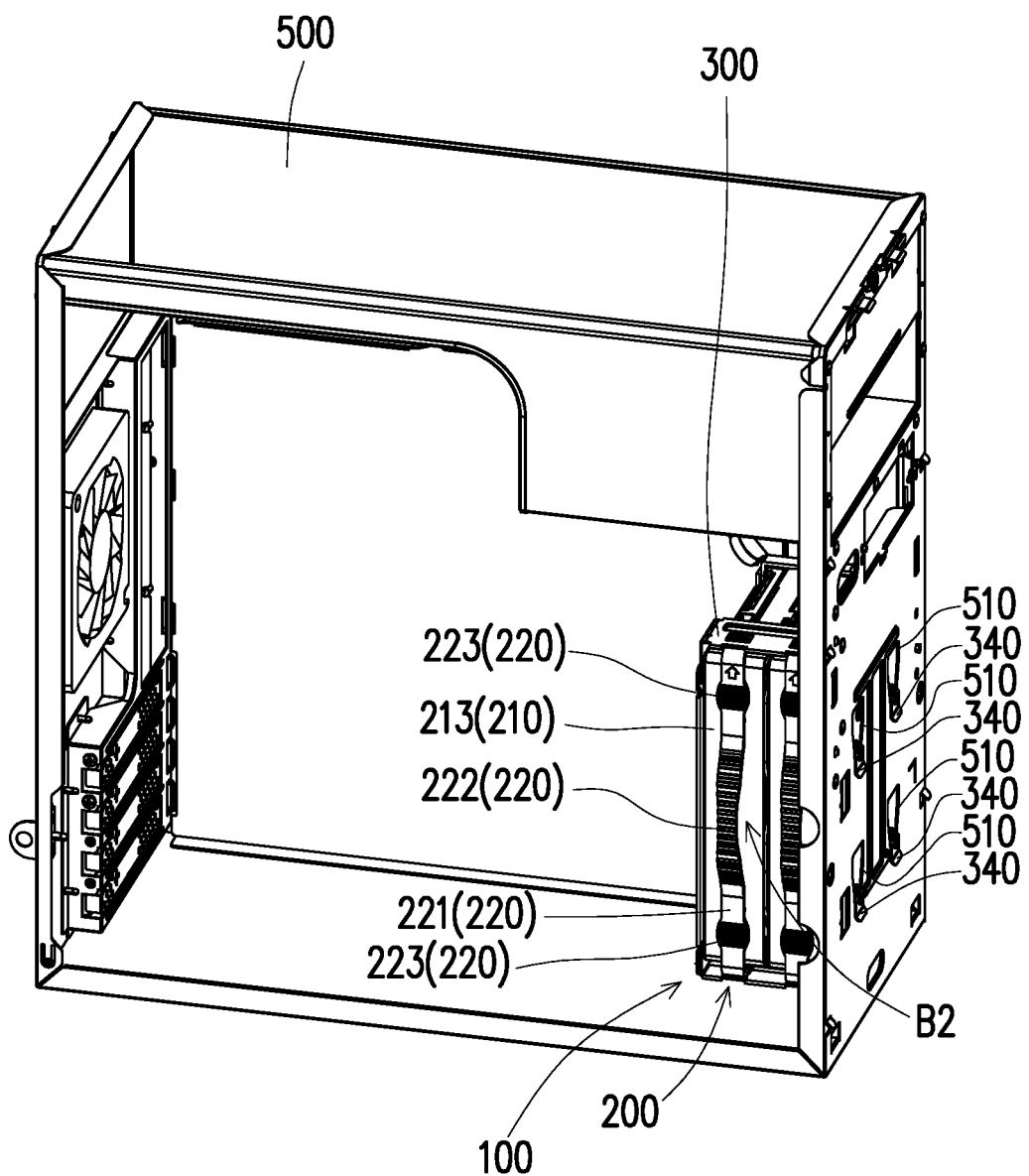
FIG. 1 is a three-dimensional schematic view of a hard disk assembly device according to an embodiment of the present disclosure, wherein a hard disk is assembled to the hard disk assembly device, and the hard disk assembly device is assembled to the case.

The examples of the exemplary embodiments are explained in the drawings in detail with reference to exemplary embodiments of the present disclosure. Wherever possible, the same component symbols used in the drawings and the description refer to the same or like parts.

Figure 2:
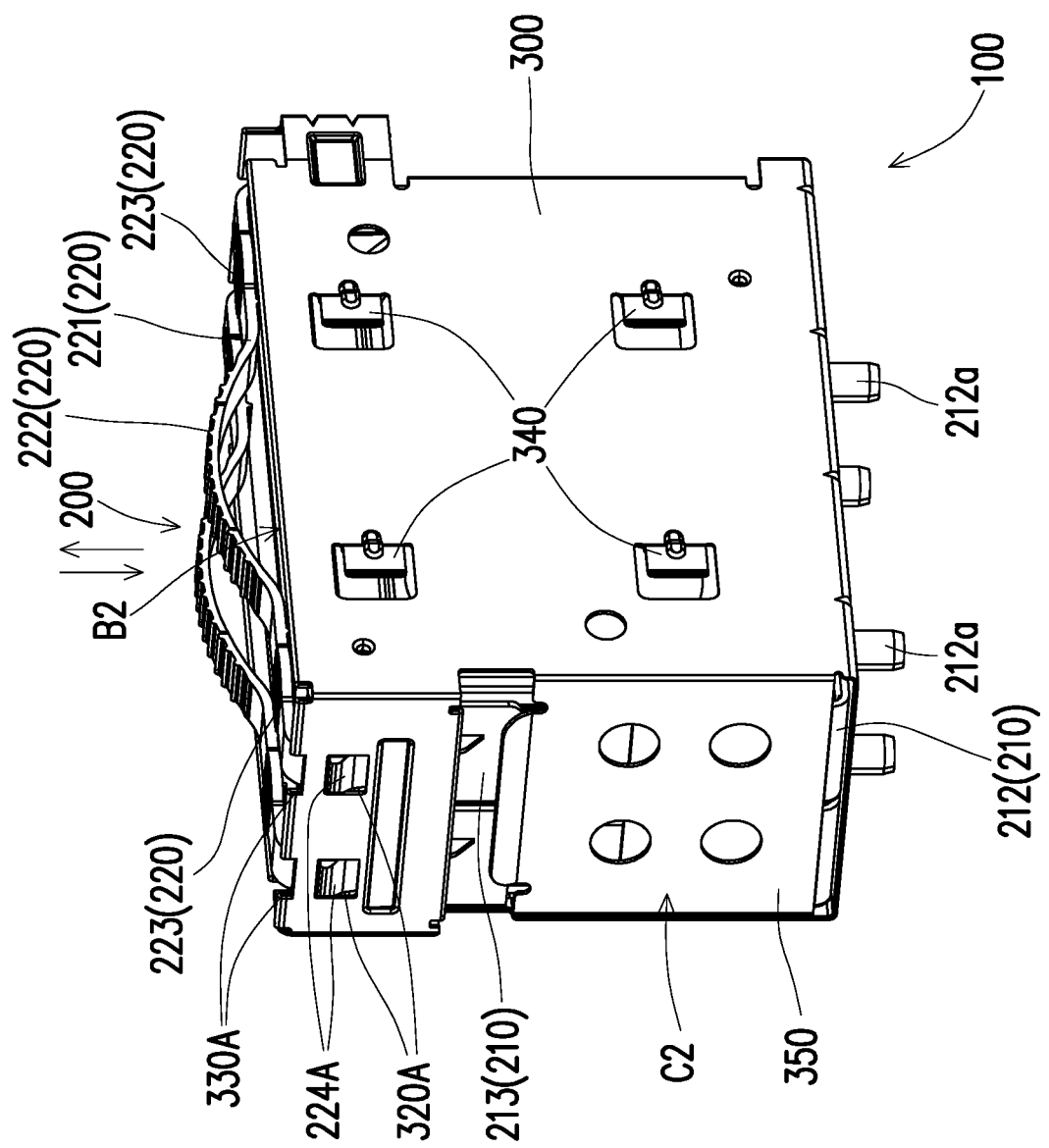
FIG. 2 is a three-dimensional schematic view of the hard disk assembly device of FIG. 1, wherein the hard disk is assembled to the hard disk assembly device.
Figure 3:
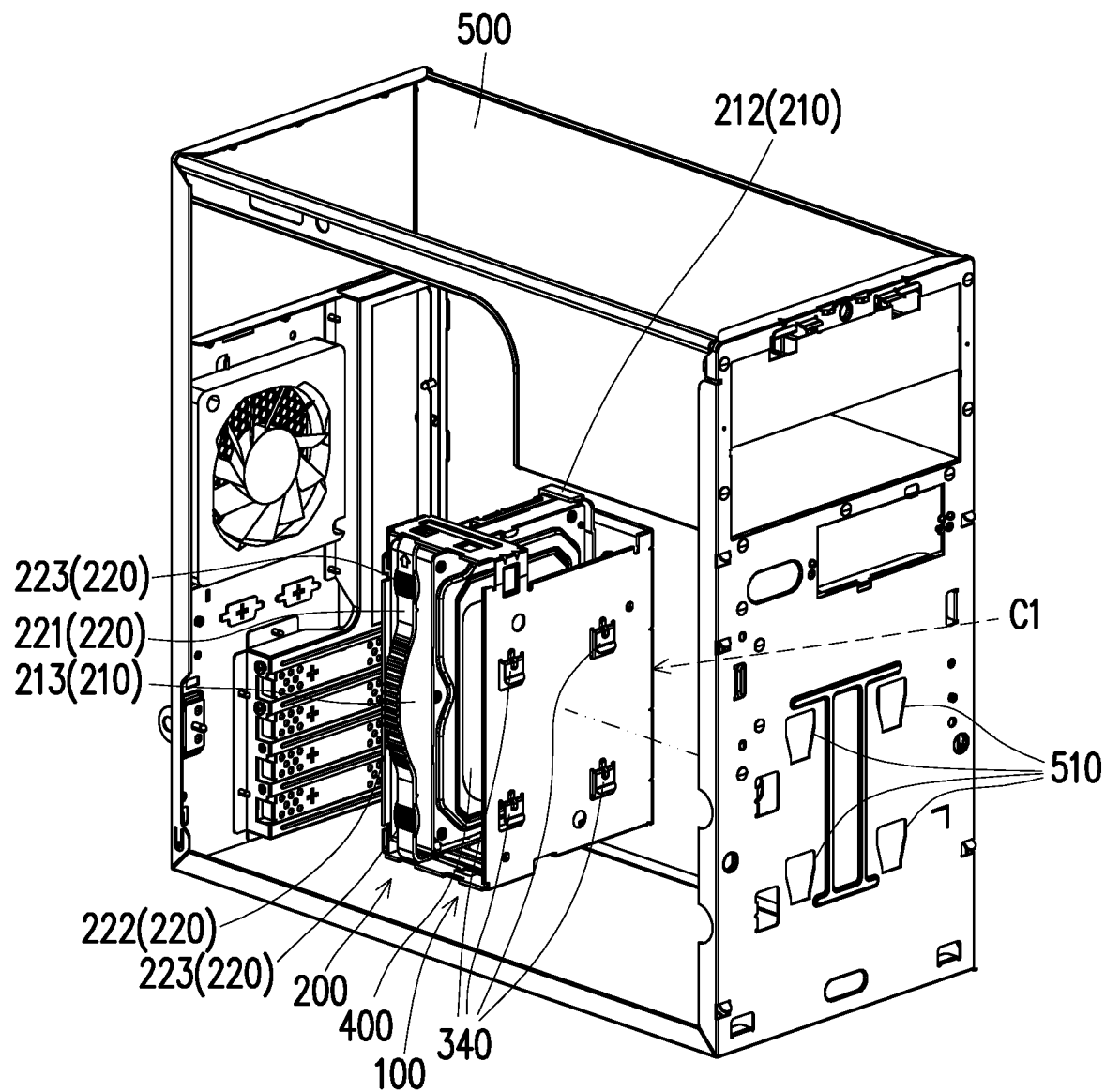
FIG. 3 is an exploded schematic view of the hard disk assembly device with the hard disk and the case of FIG. 1.

FIG. 1 is a three-dimensional schematic view of a hard disk assembly device according to an embodiment of the present disclosure, wherein a hard disk 400 is assembled to the hard disk assembly device 100, and the hard disk assembly device 100 is assembled to the case 500. FIG. 2 is a three-dimensional schematic view of the hard disk assembly device of FIG. 1, wherein the hard disk 400 is assembled to the hard disk assembly device 100. FIG. 3 is an exploded schematic view of the hard disk assembly device with the hard disk and the case of FIG. 1. In FIG. 1 to FIG. 3, the hard disk assembly device 100 is used for assembling the hard disk 400 into the case 500. In other words, the hard disk 400 can be assembled into the case 500 via the hard disk assembly device 100. The present disclosure adopts a quick disassembly and assembly structure between the hard disk 400 and the hard disk assembly device 100, thereby eliminating the use of the screws in the traditional assembly manner. Since any assembly, repair and replacement of the hard disk does not require any disassembly and assembly tool, the convenience of assembly, repair, and replacement of the hard disk can also be enhanced.

Figure 4:
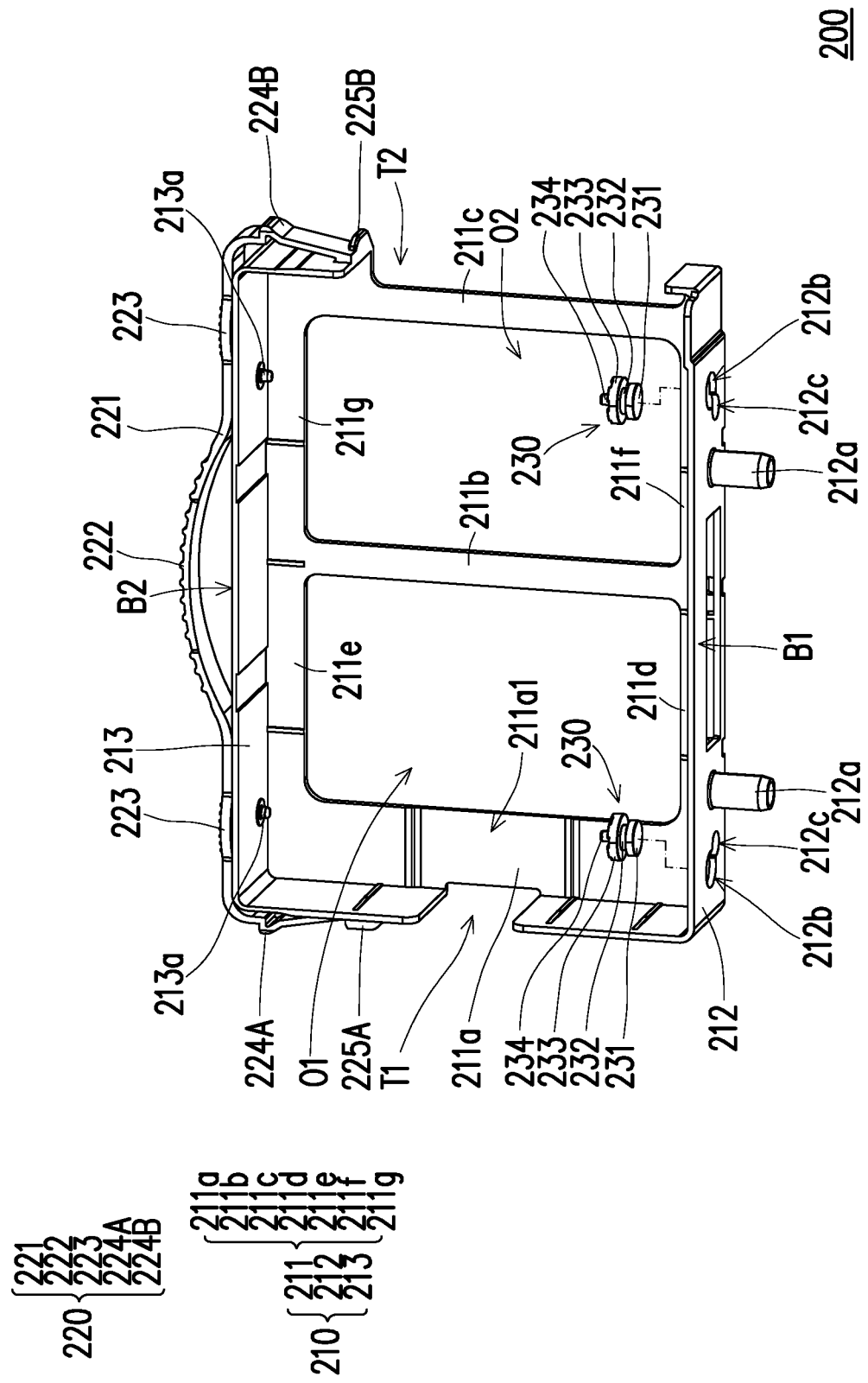
FIG. 4 is an exploded schematic view of a flexible fixing frame of FIG. 2.
Figure 5:
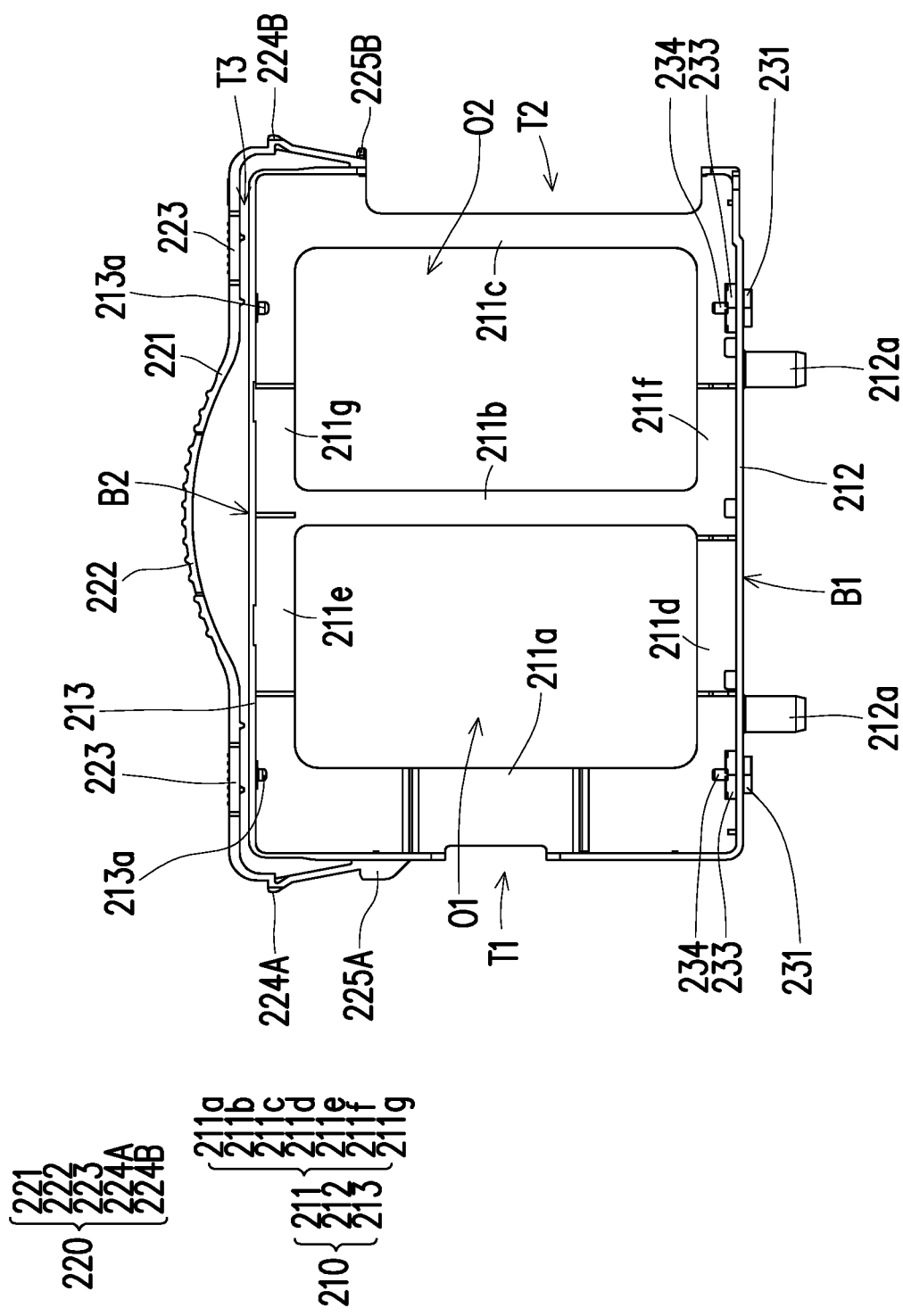
FIG. 5 is a front schematic view of the flexible fixing frame of FIG. 4.
Figure 6:
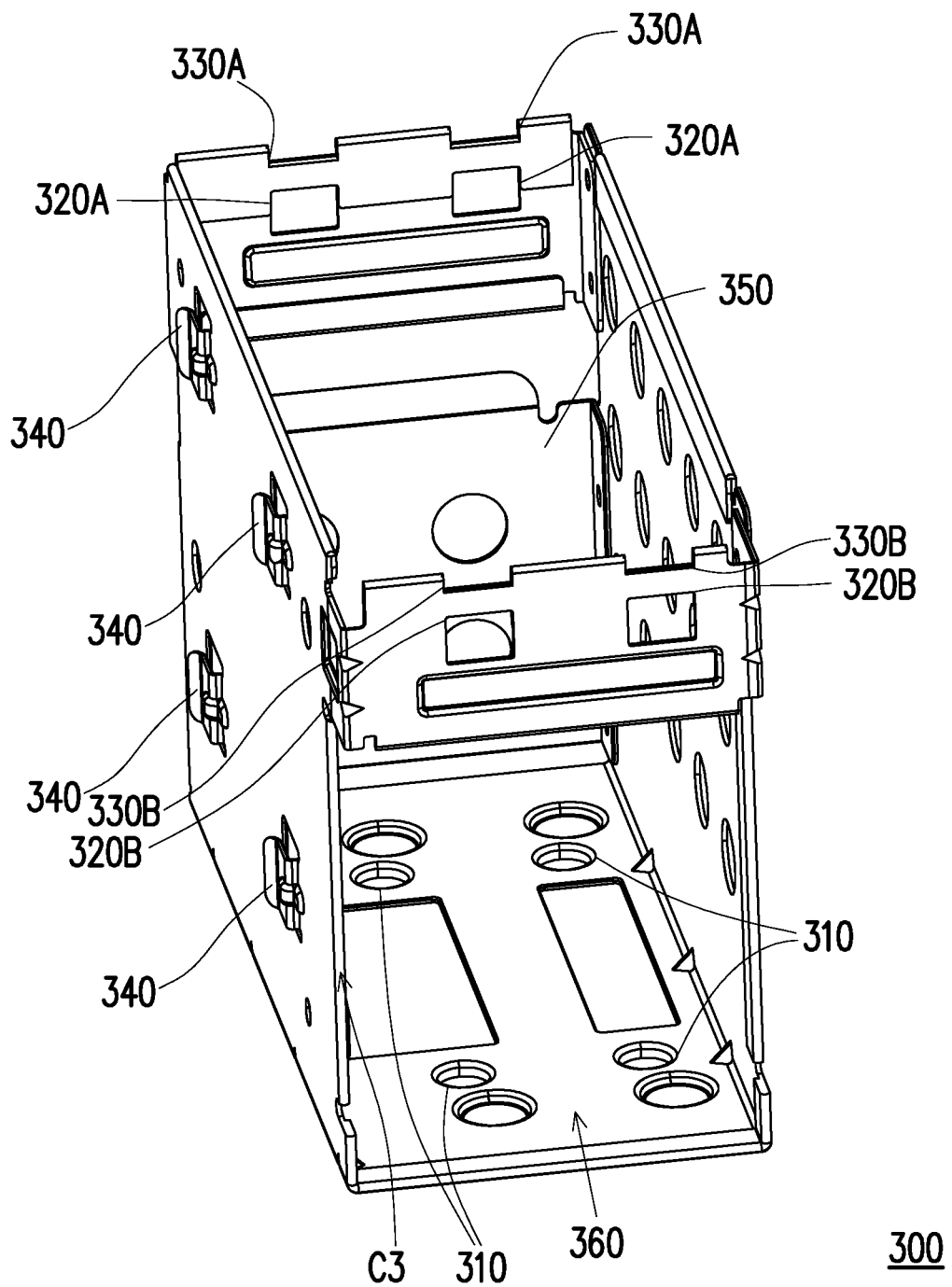
FIG. 6 is a schematic view of a fixing bracket of FIG. 2.

FIG. 4 is an exploded schematic view of a flexible fixing frame of FIG. 2. FIG. 5 is a front schematic view of the flexible fixing frame of FIG. 4. FIG. 6 is a schematic view of a fixing bracket of FIG. 2. FIG. 7 to FIG. 10 show an assembly process in which the hard disk is assembled to the fixing bracket via the flexible fixing frame. In detail, in FIG. 1, FIG. 2, FIG. 7, and FIG. 8, the hard disk 400 has a first side A1 and a second side A2 opposite to each other. The hard disk 400 has at least one first positioning portion 410 on the first side A1, and the hard disk 400 has at least one second positioning portion 420 on the second side A2. The hard disk assembly device 100 includes a flexible fixing frame 200 and a fixing bracket 300. The hard disk 400 is configured to be assembled to the flexible fixing frame 200; the flexible fixing frame 200 is configured to be assembled to the fixing bracket 300; the fixing bracket 300 is configured to be assembled to the case 500. The flexible fixing frame 200 has a third side B1 and a fourth side B2 opposite to each other. The flexible fixing frame 200 includes at least one third positioning portion 234 and at least one first guiding portion 212a on the third side B1. The flexible fixing frame 200 includes at least one fourth positioning portion 213a, a draw tape 220, and two fastening portions 224A and 224B on the fourth side B2. The two fastening portions 224A and 224B are connected with the two opposite ends of the draw tape 220. In this embodiment, the number of the at least one first positioning portion 410, the at least one second positioning portion 420, the at least one third positioning portion 234, and the at least one fourth positioning portion 213a is respectively, for example, two, but not limited thereto. For convenience of explanation, each of the above positioning portions may be described below in a single one form. When the hard disk 400 is assembled to the flexible fixing frame 200, the third positioning portion 234 is engaged with the first positioning portion 410, and the fourth positioning portion 213a is engaged with the second positioning portion 420 thus to allow the hard disk 400 to be fixed to the flexible fixing frame 200.

Figure 10:
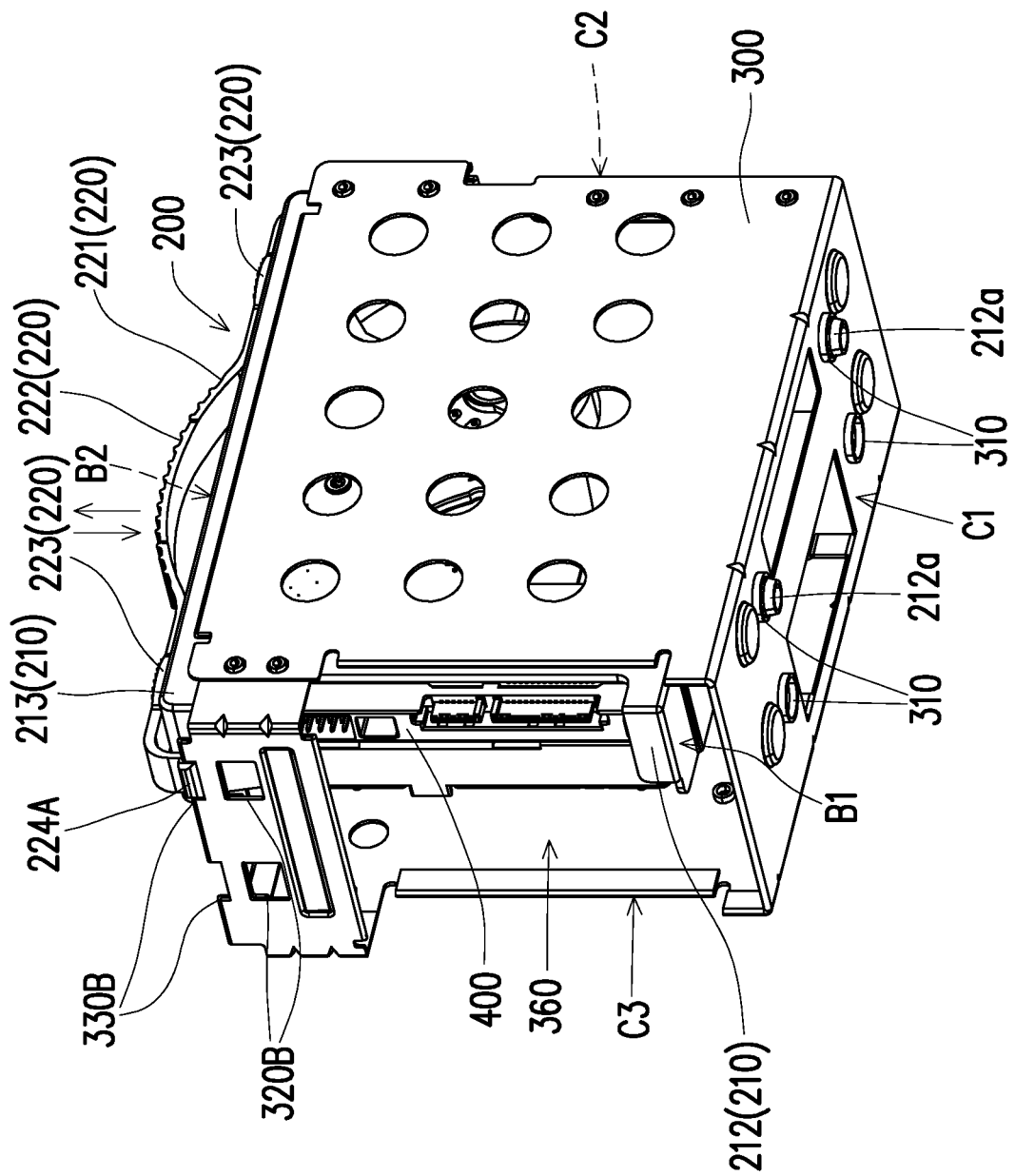

On the other hand, in FIG. 2, FIG. 6, and FIG. 10, the fixing bracket 300 has a bottom side C1 as well as a fifth side C2 and a sixth side C3 opposite to each other. The fixing bracket 300 has at least one second guiding portion 310 on the bottom side C1; the fixing bracket 300 has a limiting portion 320A and a guide portion 330A on the fifth side C2; the fixing bracket 300 has a limiting portion 320B and a guide portion 330B on the sixth side C3. In this embodiment, the number of the at least one first guiding portion 212a and the at least one second guiding portion 310 is respectively, for example, two, but not limited thereto. For convenience of explanation, each of the above guiding portions may be described below in a single one form. The two fastening portions 224A and 224B respectively abut against the two guide portions 330A and 330B to guide the flexible fixing frame 200 to slide to a position where it is correctly assembled to the fixing bracket 300. The first guiding portion 212a is inserted into the second guiding portion 310 to guide the flexible fixing frame 200 to a position where it is correctly assembled to the fixing bracket 300. When the flexible fixing frame 200 is assembled to the fixing bracket 300, the first guiding portion 212a is engaged with the second guiding portion 310, and the two fastening portions 224A and 224B are respectively correspondingly engaged with the two limiting portions 320A and 320B to allow the flexible fixing frame 200 to be fixed to the fixing bracket 300. For example, the fixing bracket 300 may be a metal material, but is not limited thereto.

Figure 7:
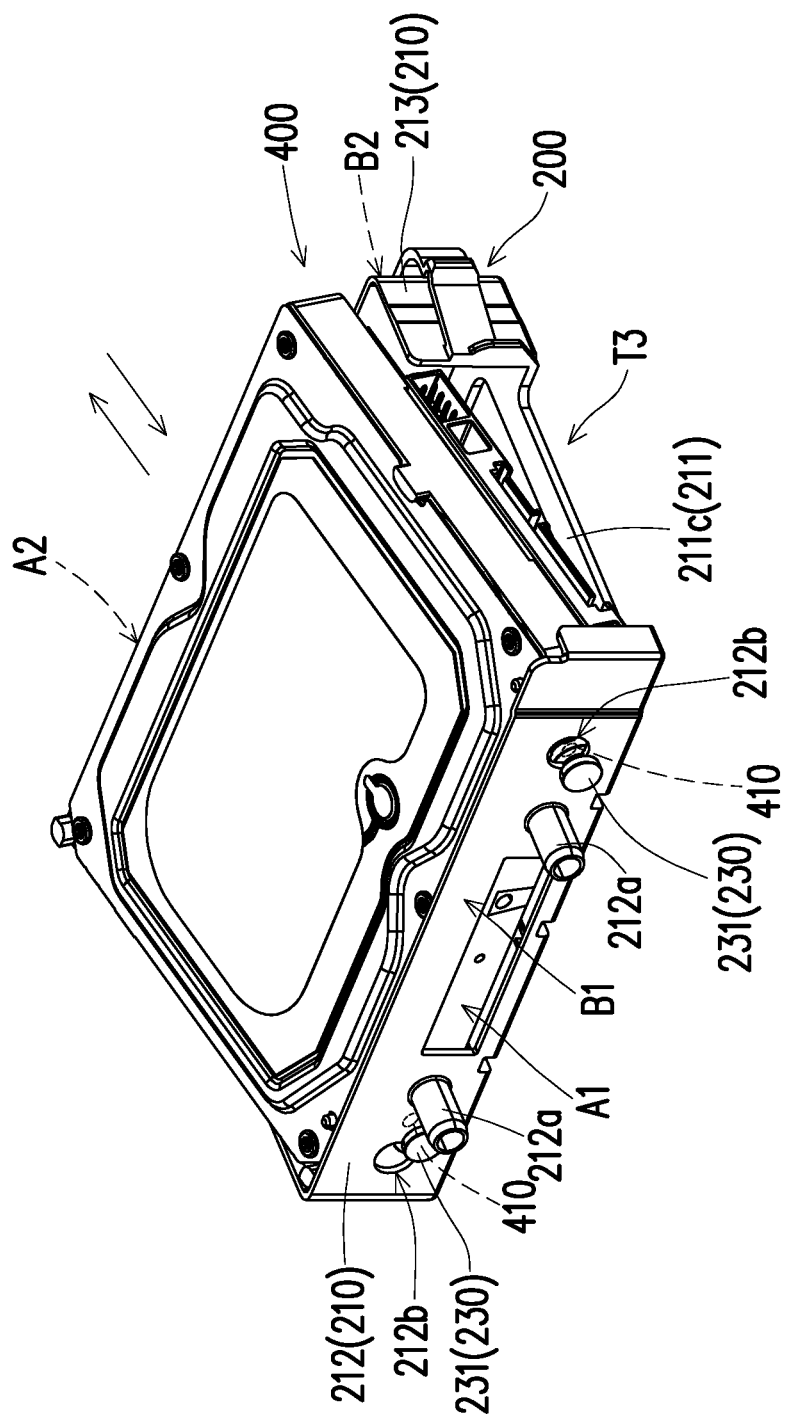
FIG. 7 to FIG. 10 show an assembly process in which the hard disk is assembled to the fixing bracket via the flexible fixing frame.

In FIG. 4 and FIG. 7, for example, the first positioning portion 410 and the second positioning portion 420 of the hard disk 400 are hole-like structures, and the third positioning portion 234 and the fourth positioning portion 213a of the flexible fixing frame 200 are columnar structures corresponding to the first positioning portion 410 and the second positioning portion 420 (or may be referred to as columnar structures corresponding to the hole-like structures). The third positioning portion 234 and the fourth positioning portion 213a of the flexible fixing frame 200 are respectively configured to pass through the first positioning portion 410 and the second positioning portion 420 of the hard disk 400 to limit the relative position between the hard disk 400 and the flexible fixing frame 200, but are not limited thereto.

In FIG. 6, FIG. 7, and FIG. 10, for example, the first guiding portion 212a of the flexible fixing frame 200 is a columnar structure, and the second guiding portion 310 of the fixing bracket 300 is a hole-like structure corresponding to the first guiding portion 212a (or may be referred to as a hole-like structure corresponding to the columnar structure). The first guiding portion 212a of the flexible fixing frame 200 is configured to pass through the second guiding portion 310 of the fixing bracket 300 to limit the relative position between the flexible fixing frame 200 and the fixing bracket 300, but not limited thereto.

In FIG. 1 to FIG. 3, in this embodiment, the case 500 includes a plurality of first engaging portions 510, and the fixing bracket 300 includes a plurality of second engaging portions 340 corresponding to the plurality of first engaging portions 510. For example, the second engaging portion 340 of the fixing bracket 300 is a hook-like structure, and the first engaging portion 510 of the case 500 is a hole-like structure corresponding to the second engaging portion 340 (or may be referred to as a hole-like structure corresponding to the hook-like structure). The second engaging portion 340 of the fixing bracket 300 is adapted to pass through the first engaging portion 510 of the case 500 and be hooked to the case to limit the relative position between the fixing bracket 300 and the case 500, but not limited thereto.

In FIG. 4, FIG. 5, and FIG. 7, the flexible fixing frame 200 includes a frame body 210. The third positioning portion 234 is coupled to the frame body 210. The first guiding portion 212a and the fourth positioning portion 213a are respectively connected with the frame body 210. The two opposite ends of the draw tape 220 are respectively connected with the frame body 210, and the frame body 210 is configured to accommodate the hard disk 400. The third positioning portion 234 is located between the first guiding portion 212a and the fourth positioning portion 213a, and the fourth positioning portion 213a is located between the third positioning portion 234 and the draw tape 220. In this embodiment, the flexible fixing frame 200 is, for example, a plastic material, and the flexible fixing frame 200 made of the plastic material is configured to generate elastic deformation to fix the hard disk 400 or fix the flexible fixing frame 200 to the fixing bracket 300, but not limited thereto. For example, the frame body 210, the first guiding portion 212a, the fourth positioning portion 213a, the draw tape 220, and the two fastening portions 224A and 224B may be integrally formed, but not limited thereto.

In detail, the frame body 210 includes a bottom frame 211, a first side wall 212, and a second side wall 213. The first side wall 212 is connected with one side of the bottom frame 211 and corresponds to the first side A1 of the hard disk 400. The second side wall 213 is connected with the other side of the bottom frame 211 and corresponds to the second side A2 of the hard disk 400. The third positioning portion 234 is coupled to the first side wall 212. The first guiding portion 212a is connected with the first side wall 212. The fourth positioning portion 213a, the draw tape 220, and the two fastening portions 224A and 224B are connected with the second side wall 213.

In this embodiment, the flexible fixing frame 200 further includes a first gap T1 and a second gap T2. The first gap T1 is located between the first side wall 212 and the second side wall 213 and is located on one side of the bottom frame 211. The second gap T2 is located between the first side wall 212 and the second side wall 213 and is located on the other side of the bottom frame 211. The first gap T1 and the second gap T2 are configured to make the second side wall 213 easy to generate elastic deformation in a direction away from the first side wall 212. On the other hand, the width of the second gap T2 is greater than the width of the first gap T1 to facilitate a flexible flat cable (not shown) to pass through, thus allowing the hard disk 400 to be connected with an external electronic device (not shown), but not limited thereto.

In FIG. 4, FIG. 5, and FIG. 7, the bottom frame 211 includes a first connecting portion 211a, a second connecting portion 211b, and a third connecting portion 211c. The second connecting portion 211b is connected with the first connecting portion 211a, and the third connecting portion 211c is connected with the second connecting portion 211b. The second connecting portion 211b is located between the first connecting portion 211a and the third connecting portion 211c. The first side wall 212 is connected with one end of the first connecting portion 211a, the second connecting portion 211b, and the third connecting portion 211c, and the second side wall 213 is connected with the other end of the first connecting portion 211a, the second connecting portion 211b, and the third connecting portion 211c.

In this embodiment, the width of the flexible fixing frame 200 at the second connecting portion 211b is equal to the width of the third connecting portion 211c, and the width of the first connecting portion 211a is greater than the width of the second connecting portion 211b and the width of the third connecting portion 211c so as to enhance the overall strength of the flexible fixing frame 200. Accordingly, the fatigue resistance of the flexible fixing frame 200 can be increased, thereby increasing the service life of the flexible fixing frame 200.

On the other hand, the first connecting portion 211a has a recess 211a1. Here the recess 211a1 of the first connecting portion 211a refers to a portion where the first connecting portion 211a is relatively thin in thickness. Since the width of the first connecting portion 211a is greater than the width of the second connecting portion 211b and the width of the third connecting portion 211c, the thickness of the first connecting portion 211a is relatively reduced at a certain portion, so that the second side wall 213 is easy to generate elastic deformation in a direction away from the first side wall 212. For example, the recess 211a1 may be located at the middle section of the first connecting portion 211a, but not limited thereto.

In the flexible fixing frame 200 of this embodiment, the bottom frame 211 has a first opening O1 between the first connecting portion 211a and the second connecting portion 211b, and the bottom frame 211 has a second opening O2 between the second connecting portion 211b and the third connecting portion 211c. The first opening O1 and the second opening O2 make the second side wall 213 easy to generate elastic deformation in a direction away from the first side wall 212 and help the hard disk 400 dissipate heat.

The bottom frame 211 may further include a fourth connecting portion 211d, a fifth connecting portion 211e, a sixth connecting portion 211f, and a seventh connecting portion 211g. The two ends of the fourth connecting portion 211d are connected with one end of the first connecting portion 211a and one end of the second connecting portion 211b, and the two ends of the fifth connecting portion 211e are connected with the other end of the first connecting portion 211a and the other end of the second connecting portion 211b. The two ends of the sixth connecting portion 211f are connected with one end of the second connecting portion 211b and one end of the third connecting portion 211c, and the two ends of the seventh connecting portion 211g are connected with the other end of the second connecting portion 211b and the other end of the third connecting portion 211c. The first side wall 212 is connected with the fourth connecting portion 211d and the sixth connecting portion 211f, and the second side wall 213 is connected with the fifth connecting portion 211e and the seventh connecting portion 211g. In other words, the second connecting portion 211b is located between the fourth connecting portion 211d and the sixth connecting portion 211f, and the second connecting portion 211b is located between the fifth connecting portion 211e and the seventh connecting portion 211g. On the other hand, the first connecting portion 211a, the second connecting portion 211b, the fourth connecting portion 211d, and the fifth connecting portion 211e can form the first opening O1, and the second connecting portion 211b, the third connecting portion 211c, the fifth connecting portion 211e, and the seventh connecting portion 211g can form the second opening O2, but not limited thereto.

In FIG. 4 and FIG. 5, the flexible fixing frame 200 further includes at least one positioning member 230, and the flexible fixing frame 200 has at least one first fastening hole 212b and at least one second fastening hole 212c communicating with the at least one first fastening hole 212b at the first side wall 212 of the frame body 210. For example, the number of the at least one positioning member 230, the at least one first fastening hole 212b, and the at least one second fastening hole 212c is respectively two. For convenience of explanation, the two positioning members 230, the two first fastening holes 212b, and the two second fastening holes 212c are described below only in a single one form. The positioning member 230 includes a body 231, a penetrating portion 232, and a buffer portion 233. The body 231 is configured to pass through the first fastening hole 212b, and the penetrating portion 232 is connected with the body 231 and is configured to pass through one of the first fastening hole 212b and the second fastening hole 212c. The buffer portion 233 is connected with the penetrating portion 232, and the penetrating portion 232 is located between the body 231 and the buffer portion 233. The third positioning portion 234 is connected with the buffer portion 233, and the buffer portion 233 is located between the penetrating portion 232 and the third positioning portion 234. The buffer portion 233 is configured to abut against the hard disk 400 to reduce the vibration transmitted into the hard disk 400 by the case 500.

For example, the hole diameter of the first fastening hole 212b is greater than the hole diameter of the second fastening hole 212c; the outer diameter of the body 231 is equal to the hole diameter of the first fastening hole 212b; the outer diameter of the penetrating portion 232 is equal to the hole diameter of the second fastening hole 212c; the outer diameter of the buffer portion 233 is greater than both the hole diameter of the first fastening hole 212b and the hole diameter of the second fastening hole 212c. In other words, the outer diameter of the positioning member 230 at the body 231 is greater than the outer diameter of the positioning member 230 at the penetrating portion 232, and the outer diameter of the body 231 and the outer diameter of the buffer portion 233 are respectively greater than the hole diameter of the second fastening hole 212c. Accordingly, when the penetrating portion 232 moves into the second fastening hole 212c, the first side wall 212 is sandwiched by the body 231 and the buffer portion 233, so that the positioning member 230 can be fixed to the frame body 210.

In this embodiment, the draw tape 220 includes a tape body 221, a pulling portion 222, two pressing portions 223, and the aforementioned two fastening portions 224A and 224B. The two ends of the tape body 221 are respectively connected with the frame body 210. The pulling portion 222 is connected with the tape body 221 and configured to make the tape body 221 generate elastic deformation in a direction away from the frame body 210. The two pressing portions 223 are connected with the tape body 221, and the pulling portion 222 is located between the two pressing portions 223. The two fastening portions 224A and 224B are connected with the two opposite ends of the tape body 221. The two pressing portions 223 are configured to move the two fastening portions 224A and 224B into the two limiting portions 320A and 320B.

For example, the two fastening portions 224A and 224B of the flexible fixing frame 200 are hook-like structures, and the two limiting portions 320A and 320B of the fixing bracket 300 are hole-like structures corresponding to the two fastening portions 224A and 224B (or may be referred to as hole-like structures corresponding to the hook-like structures). The two fastening portions 224A and 224B pass through and are engage with the two limiting portions 320A and 320B to limit the relative position between the flexible fixing frame 200 and the fixing bracket 300, but not limited thereto.

In other words, as shown in FIG. 5, since the draw tape 220 is connected with the frame body 210 only at the two ends of the tape body 221, the flexible fixing frame 200 has a third gap T3 between the draw tape 220 and the frame body 210. The third gap T3 is configured to make the draw tape 220 easy to generate elastic deformation in a direction away from the two limiting portions 320A and 320B further to move the two fastening portions 224A and 224B out of the two limiting portions 320A and 320B.

In addition, since the draw tape 220 is connected with the frame body 210 only at the two ends of the tape body 221, the draw tape 220 may further include two reinforcing portions 225A and 225B connected with the two ends of the tape body 221 to increase the connection strength between the draw tape 220 and the frame body 210, thereby increasing the service life of the draw tape 220.

In FIG. 2, FIG. 6, and FIG. 10, in this embodiment, the fixing bracket 300 may further have a retaining wall 350, a notch 360, and a locking hole respectively located on two sides of the bracket 300. For example, the retaining wall 350 is located on the fifth side C2 of the fixing bracket 300, and the notch 360 is located on the sixth side C3 of the fixing bracket 300. The locking hole and the second engaging portion 340 are located on the same side of the fixing bracket 300. The retaining wall 350 is configured to cover the flexible fixing frame 200; the notch 360 is configured to provide a space for a flexible flat cable (not shown) to pass through; the locking hole is available for a locking member (not shown) to pass through thus to allow the fixing bracket 300 to be fixed to the case 500.

The structure of the hard disk assembly device 100 of the present disclosure has been described above, and the assembly steps of assembling the hard disk 400 to the case 500 by the hard disk assembly device 100 may be described below:

In FIG. 4, FIG. 5, and FIG. 7, the steps of assembling the hard disk 400 to the flexible fixing frame 200 are firstly described: a hard disk 400 is provided; the first side A1 of the hard disk 400 is oriented toward the inner wall surface of the first side wall 212 of the flexible fixing frame 200 on the third side B1; the first positioning portion 410 of the hard disk 400 on the first side A1 is aligned with the third positioning portion 234 of the flexible fixing frame 200 on the inner wall surface of the first side wall 212; the third positioning portion 234 of the flexible fixing frame 200 on the inner wall surface of the first side wall 212 passes through the first positioning portion 410 of the hard disk 400 on the first side A1 thus to allow the first side A1 of the hard disk 400 to be fixed to the third side B1 of the flexible fixing frame 200.

Figure 8:
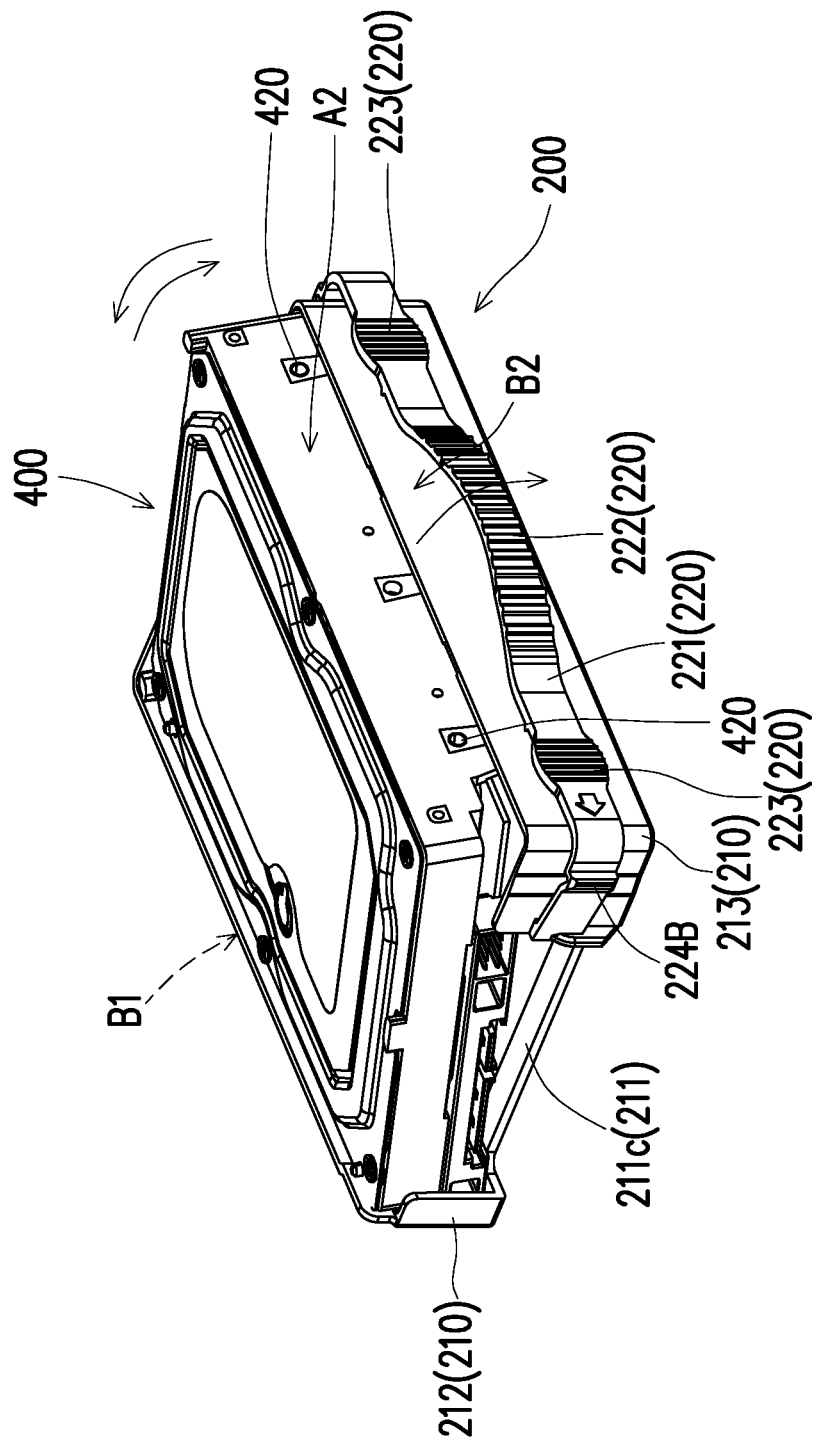
Figure 9:
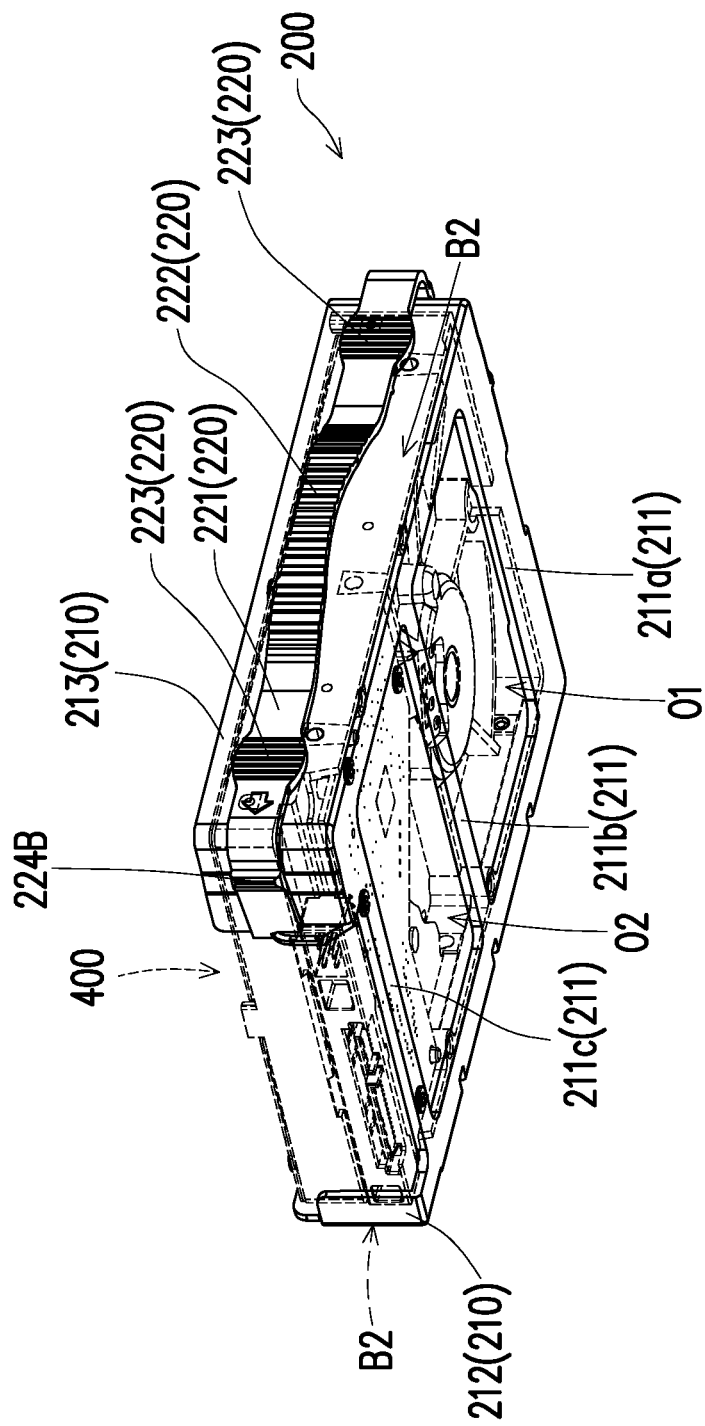

Next, in FIG. 4, FIG. 5, and FIG. 8, the steps of fixing the second side A2 of the hard disk 400 to the fourth side B2 of the flexible fixing frame 200 are described: a force is applied to make the second side wall 213 of the flexible fixing frame 200 on the fourth side B2 generate elastic deformation in a direction away from the first side wall 212 of the flexible fixing frame 200 on the third side B1 such that the accommodating space of the flexible fixing frame 200 inside the frame body 210 is increased; the second side A2 of the hard disk 400 is moved into the accommodating space inside the frame body 210 of the flexible fixing frame 200 such that the hard disk 400 abuts against the bottom frame 211 of the flexible fixing frame 200; the force applied to the second side wall 213 of the flexible fixing frame 200 on the fourth side B2 is removed to make the fourth positioning portion 213a of the flexible fixing frame 200 on the inner wall surface of the fourth side B2 pass through the second positioning portion 420 of the hard disk 400 on the second side A2, such that the second side A2 of the hard disk 400 is fixed to the fourth side B2 of the flexible fixing frame 200. At this time, the third positioning portion 234 passes through the first positioning portion 410 (for example, a screw hole originally existing in the hard disk 400), and the fourth positioning portion 213a passes through the second positioning portion 420 (for example, a screw hole originally existing in the hard disk 400), such that the hard disk 400 can be firmly fixed to the flexible fixing frame 200, as shown in FIG. 9.

Next, in FIG. 4, FIG. 6, and FIG. 10, the steps of assembling the flexible fixing frame 200 to the fixing bracket 300 are described: the third side B3 of the flexible fixing frame 200 is oriented toward the inner wall surface of the bottom side C1 of the fixing bracket 300; the first guiding portion 212a of the flexible fixing frame 200 on the third side B1 is inserted into the second guiding portion 310 of the fixing bracket 300 on the bottom side C1, and the two fastening portions 224A and 224B of the flexible fixing frame 200 abut against the guide portions 330A and 330B of the fixing bracket 300 on the fifth side C2 and the sixth side C3 to guide the flexible fixing frame 200 to a position where it is correctly assembled to the fixing bracket 300; a down force is applied to make the draw tape 220 of the flexible fixing frame 200 generate elastic deformation to allow the two fastening portions 224A and 224B of the flexible fixing frame 200 to move in a direction away from the two guide portions 330A and 330B (or may be referred to the direction away from the two limiting portions 320A and 320B); the down force is continuously applied to allow the third side B3 of the flexible fixing frame 200 to abut against the bottom side C1 of the fixing bracket 300; a pressing force is applied to the two pressing portions 223 of the draw tape 220 to make the draw tape 220 of the flexible fixing frame 200 generate elastic deformation, and the two fastening portions 224A and 224B of the flexible fixing frame 200 move toward the two limiting portions 320A and 320B of the fixing bracket 300 and engage with the two limiting portions 320A and 320B such that the flexible fixing frame 200 is fixed to the fixing bracket. At this time, the two first guiding portions 212a of the flexible fixing frame 200 on the third side B1 are engaged with the two second guiding portions 310 of the fixing bracket 300 on the bottom side C1, and the flexible fixing frame 200 can be firmly fixed to the fixing bracket 300 by the engaging force between the two fastening portions 224A and 224B and the two limiting portions 320A and 320B, as shown in FIG. 2.

Afterwards, in FIG. 1 to FIG. 3, the steps of assembling the fixing bracket 300 to the case 500 are described: the second engaging portion 340 of the fixing bracket 300 is aligned with the first engaging portion 510 of the case 500; the fixing bracket 300 is moved toward the case 500 to allow the second engaging portion 340 of the fixing bracket 300 to move into the first engaging portion 510 of the case 500; a down force is applied to make the second engaging portion 340 of the fixing bracket 300 engaged with the first engaging portion 510 of the case 500 to allow the fixing bracket 300 to be fixed to the case 500. At this time, the hard disk 400 can be firmly fixed to the case 500 via the flexible fixing frame 200 and the fixing bracket 300, as shown in FIG. 1. Accordingly, in the hard disk assembly device 100 of the present disclosure, the hard disk 400 can be quickly assembled into the case 500 via the hard disk assembly device 100, and therefore the hard disk 400 can be quickly assembled on the production line, thereby reducing the waste of assembly time, increasing the productivity of the product, and reducing the assembly cost. On the other hand, the flexible fixing frame 200 made of the plastic material can absorb external vibration (for example, vibration from the case 500), and can protect the hard disk 400 from external vibration, thereby increasing the service life of the hard disk 400.

In addition, after the second engaging portion 340 of the fixing bracket 300 is engaged with the first engaging portion 510 of the case 500, the locking member (not shown) can be further locked into the locking hole of the fixing bracket 300, such that the fixing bracket 300 is further firmly fixed to the case 500.

Next, in FIG. 1 and FIG. 2, the steps of quickly disassembling the hard disk 400 from the case 500 are described: a pulling force is applied to the pulling portion 222 of the flexible fixing frame 200 at the draw tape 220 to allow the two fastening portions 224A and 224B of the flexible fixing frame 200 to move in a direction away from the two limiting portions 320A and 320B of the fixing bracket 300, thereby releasing the bond between the flexible fixing frame 200 and the fixing bracket 300; the pulling force is continuously applied to move the flexible fixing frame 200 out of the fixing bracket 300. At this time, the flexible fixing frame 200 can be directly removed from the fixing bracket 300 without any tools, and the fixing bracket 300 can still be fixed to the case 500. Afterwards, the hard disk 400 can be directly disassembled from the flexible fixing frame 200 without using any tools by using the reverse steps of assembling the hard disk 400 to the flexible fixing frame 200. The relevant steps are not repeated here.

In other words, when the user needs to replace or repair the hard disk 400, he/she can directly remove the flexible fixing frame 200 from the fixing bracket 300 without using any tools via the quick disassembly design of the hard disk assembly device 100 of the present disclosure, and he/she can further remove the hard disk 400 from the flexible fixing frame. Accordingly, the disassembly of the hard disk 400 is fast and convenient, thereby eliminating the use of the screws in the traditional assembly manner. Since any assembly, repair, and replacement of the hard disk does not require any disassembly and assembly tool, the convenience of assembly, repair, and replacement of the hard disk can also be enhanced.

Finally, it should be noted that the above embodiments are only used to illustrate the technical solutions of the present disclosure, and are not limited thereto. Although the present disclosure has been described in detail with reference to the foregoing embodiments, those skilled in the art should understand that the technical solutions described in the foregoing embodiments may be modified or equivalently substituted for some or all of the technical features. These modifications and substitutions do not depart from the scope of the technical solutions of the embodiments of the present disclosure.

What is claimed is:

1. A hard disk assembly device for assembling a hard disk into a case, two opposite sides of the hard disk respectively having at least one first positioning portion and at least one second positioning portion, the hard disk assembly device comprising:
   a flexible fixing frame, one side of the flexible fixing frame including at least one third positioning portion and at least one first guiding portion, the other side of the flexible fixing frame including at least one fourth positioning portion, a draw tape, and two fastening portions, the two fastening portions being respectively correspondingly connected with two ends of the draw tape, wherein when the hard disk is assembled to the flexible fixing frame, the at least one third positioning portion is engaged with the at least one first positioning portion, and the at least one fourth positioning portion is engaged with the at least one second positioning portion to allow the hard disk to be fixed in the flexible fixing frame; and
   a fixing bracket capable of being fixed in the case, the bottom side of the fixing bracket having at least one second guiding portion, and two sides of the fixing bracket respectively having a limiting portion, where when the flexible fixing frame is assembled to the fixing bracket, the at least one first guiding portion is engaged with the at least one second guiding portion, and the two fastening portions are respectively correspondingly engaged with the two limiting portions to allow the flexible fixing frame to be fixed to the fixing bracket.

2. The hard disk assembly device according to claim 1, wherein the flexible fixing frame is a plastic material, and the flexible fixing frame is capable of generating elastic deformation.

3. The hard disk assembly device according to claim 1, wherein the fixing bracket is a metal material.

4. The hard disk assembly device according to claim 1, wherein the at least one first positioning portion and the at least one second positioning portion are hole-like structures, the at least one third positioning portion and the at least one fourth positioning portion are columnar structures corresponding to the at least one first positioning portion and the at least one second positioning portion, and the at least one third positioning portion and the at least one fourth positioning portion are respectively correspondingly engaged with the at least one first positioning portion and the at least one second positioning portion to limit the relative position between the hard disk and the flexible fixing frame.

5. The hard disk assembly device according to claim 1, wherein the at least one first guiding portion is a columnar structure, the at least one second guiding portion is a hole-like structure corresponding to the at least one first guiding portion, and the at least one first guiding portion is engaged with the at least one second guiding portion to limit the relative position between the flexible fixing frame and the fixing bracket.

6. The hard disk assembly device according to claim 1, where the two fastening portions are hook-like structures, the two limiting portions are hole-like structures corresponding to the two fastening portions, and the two fastening portions are engaged with the two limiting portions to limit the relative position between the flexible fixing frame and the fixing bracket.

7. The hard disk assembly device according to claim 1, wherein the flexible fixing frame comprises:
   a frame body, the at least one third positioning portion being coupled to the frame body, the at least one first guiding portion and the at least one fourth positioning portion being respectively connected with the frame body, the two ends of the draw tape being respectively connected with the frame body, and the frame body being configured to accommodate the hard disk, wherein the at least one third positioning portion is located between the at least one first guiding portion and the at least one fourth positioning portion, and the at least one fourth positioning portion is located between the at least one third positioning portion and the draw tape.

8. The hard disk assembly device according to claim 7, wherein the frame body, the at least one first guiding portion, the at least one fourth positioning portion, the draw tape, and the two fastening portions are integrally formed.

9. The hard disk assembly device according to claim 7, wherein the frame body comprises:
   a bottom frame;
   a first side wall connected with one side of the bottom frame, wherein the at least one third positioning portion is coupled to the first side wall, and the at least one first guiding portion is connected with the first side wall; and
   a second side wall connected with the other side of the bottom frame, wherein the at least one fourth positioning portion, the draw tape, and the two fastening portions are connected with the second side wall.

10. The hard disk assembly device according to claim 9, wherein the flexible fixing frame further comprises a first gap and a second gap, the first gap is located between the first side wall and the second side wall and is located on one side of the bottom frame, the second gap is located between the first side wall and the second side wall and is located on the other side of the bottom frame, and the first gap and the second gap are configured to make the second side wall easy to generate elastic deformation in a direction away from the first side wall.

11. The hard disk assembly device according to claim 9, wherein the bottom frame comprises:
   a first connecting portion;
   a second connecting portion connected with the first connecting portion; and
   a third connecting portion connected with the second connecting portion, the second connecting portion being located between the first connecting portion and the third connecting portion, wherein the first side wall is connected with one end of the first connecting portion, the second connecting portion, and the third connecting portion, and the second side wall is connected with the other end of the first connecting portion, the second connecting portion, and the third connecting portion.

12. The hard disk assembly device according to claim 11, wherein the bottom frame further comprises:
- a fourth connecting portion, two ends of the fourth connecting portion being connected with one end of the first connecting portion and one end of the second connecting portion;
- a fifth connecting portion, two ends of the fifth connecting portion being connected with the other end of the first connecting portion and the other end of the second connecting portion;
- a sixth connecting portion, two ends of the sixth connecting portion being connected with one end of the second connecting portion and one end of the third connecting portion, wherein the second connecting portion is located between the fourth connecting portion and the sixth connecting portion; and
- a seventh connecting portion, two ends of the seventh connecting portion being connected with the other end of the second connecting portion and the other end of the third connecting portion, wherein the second connecting portion is located between the fifth connecting portion and the seventh connecting portion, the first side wall is connected with the fourth connecting portion and the sixth connecting portion, and the second side wall is connected with the fifth connecting portion and the seventh connecting portion.

13. The hard disk assembly device according to claim 11, wherein the width of the first connecting portion is greater than the width of the second connecting portion and the width of the third connecting portion, so as to enhance the overall strength of the flexible fixing frame.

14. The hard disk assembly device according to claim 11, wherein the first connecting portion has a recess, and the recess is configured to make the second side wall easy to generate elastic deformation in a direction away from the first side wall.

15. The hard disk assembly device according to claim 11, where the bottom frame has a first opening between the first connecting portion and the second connecting portion, the bottom frame has a second opening between the second connecting portion and the third connecting portion, and the first opening and the second opening are configured to make the second side wall easy to generate elastic deformation in a direction away from the first side wall.

16. The hard disk assembly device according to claim 7, wherein the flexible fixing frame further comprises at least one positioning member, the frame body has at least one first fastening hole and at least one second fastening hole communicating with the at least one first fastening hole, and the at least one positioning member comprises:
- a body configured to pass through the at least one first fastening hole;
- a penetrating portion connected with the body and configured to pass through one of the at least one first fastening hole and the at least one second fastening hole, wherein when the penetrating portion moves into the second fastening hole, the positioning member is fixed to the frame body; and
- a buffer portion connected with the penetrating portion, the penetrating portion being located between the body and the buffer portion, wherein the at least one third positioning portion is connected with the buffer portion, the buffer portion is located between the penetrating portion and the at least one third positioning portion, and the buffer portion is configured to abut against the hard disk to reduce the vibration transmitted into the hard disk by the case.

17. The hard disk assembly device according to claim 16, wherein the hole diameter of the at least one first fastening hole is greater than the hole diameter of the at least one second fastening hole, the outer diameter of the body is equal to the hole diameter of the at least one first fastening hole, the outer diameter of the penetrating portion is equal to the hole diameter of the at least one second fastening hole, and the outer diameter of the buffer portion is greater than the hole diameter of the at least one first fastening hole and the hole diameter of the at least one second fastening hole.

18. The hard disk assembly device according to claim 7, wherein the draw tape comprises:
- a tape body, two ends of the tape body being respectively connected with the frame body;
- a pulling portion connected with the tape body and configured to make the tape body generate elastic deformation in a direction away from the frame body; and
- two pressing portions connected with the tape body, wherein the pulling portion is located between the two pressing portions, and the two pressing portions are configured to help the two fastening portions move into the two limiting portions.

19. The hard disk assembly device according to claim 18, wherein the draw tape further comprises:
- two reinforcing portions connected with the two ends of the tape body to increase the connection strength between the draw tape and the frame body.

20. The hard disk assembly device according to claim 18, wherein the flexible fixing frame has a third gap located between the draw tape and the frame body, and the third gap is configured to make the draw tape easy to generate elastic deformation in a direction away from the two limiting portions further to allow the two fastening portions to move out of the two limiting portions.

* * * * *